(No Model.) 2 Sheets—Sheet 1.

A. BECHMANN.
EDUCATIONAL APPLIANCE.

No. 521,360. Patented June 12, 1894.

Witnesses:

Inventor:
Albertina Bechmann,
By Geo. J. Parkinson,
Her Attorney.

THE NATIONAL LITHOGRAPHING COMPANY,
WASHINGTON, D. C.

(No Model.)  2 Sheets—Sheet 2.

A. BECHMANN.
EDUCATIONAL APPLIANCE.

No. 521,360. Patented June 12, 1894.

| X1 | X2 | X3 | X4 | X5 | X6 | X7 | X8 | X9 | X10 | X11 | X12 | ÷ | +- |
| 1 | 2 | 3 | 4 | 5 | 6 | 7 | 8 | 9 | 10 | 11 | 12 | 1 | 1 |
|---|---|---|---|---|---|---|---|---|---|---|---|---|---|
| 2 | 4 | 6 | 8 | 10 | 12 | 14 | 16 | 18 | 20 | 22 | 24 | 2 | 2 |
| 3 | 6 | 9 | 12 | 15 | 18 | 21 | 24 | 27 | 30 | 33 | 36 | 3 | 3 |
| 4 | 8 | 12 | 16 | 20 | 24 | 28 | 32 | 36 | 40 | 44 | 48 | 4 | 4 |
| 5 | 10 | 15 | 20 | 25 | 30 | 35 | 40 | 45 | 50 | 55 | 60 | 5 | 5 |
| 6 | 12 | 18 | 24 | 30 | 36 | 42 | 48 | 54 | 60 | 66 | 72 | 6 | 6 |
| 7 | 14 | 21 | 27 | 35 | 42 | 49 | 56 | 63 | 70 | 77 | 84 | 7 | 7 |
| 8 | 16 | 24 | 32 | 40 | 48 | 56 | 64 | 72 | 80 | 88 | 96 | 8 | 8 |
| 9 | 18 | 27 | 36 | 45 | 54 | 63 | 72 | 81 | 90 | 99 | 108 | 9 | 9 |
| 10 | 20 | 30 | 40 | 50 | 60 | 70 | 80 | 90 | 100 | 110 | 120 | 10 | 10 |
| 11 | 22 | 33 | 44 | 55 | 66 | 77 | 88 | 99 | 110 | 121 | 132 | 11 |  |
| 12 | 24 | 36 | 48 | 60 | 72 | 84 | 96 | 108 | 120 | 132 | 144 | 12 |  |

Witnesses.
J. Thomson Cross
P. W. Sommers

Inventor:
Albertina Bechmann,
By Geo. B. Parkinson,
Her Attorney.

UNITED STATES PATENT OFFICE.

ALBERTINA BECHMANN, OF CINCINNATI, OHIO.

EDUCATIONAL APPLIANCE.

SPECIFICATION forming part of Letters Patent No. 521,360, dated June 12, 1894.

Application filed December 28, 1893. Serial No. 494,981. (No model.)

*To all whom it may concern:*

Be it known that I, ALBERTINA BECHMANN, a citizen of the United States of America, residing at Cincinnati, in the county of Hamilton and State of Ohio, have invented certain new and useful Improvements in Educational Appliances, of which the following is a specification.

My invention relates to improvements in educational appliances.

The object of the invention is to provide a means whereby the addition, subtraction, multiplication and division of numbers may be easily and readily learned by a child without the aid of a teacher and in a manner to firmly impress the lesson upon the mind.

The invention consists in the construction, combination and arrangement of parts hereinafter described and claimed.

Figure 1:
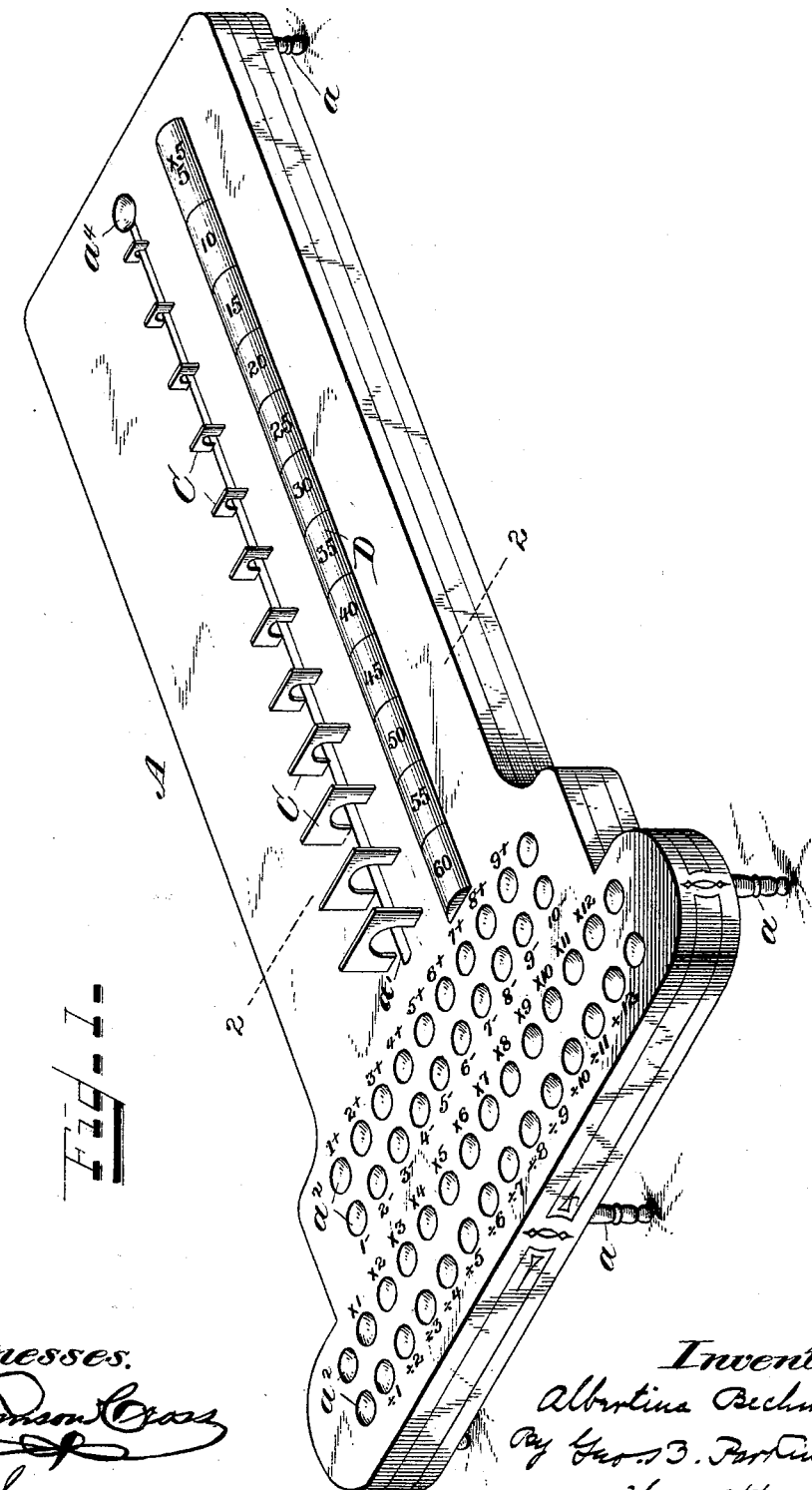
Figures 2, 3, 4:
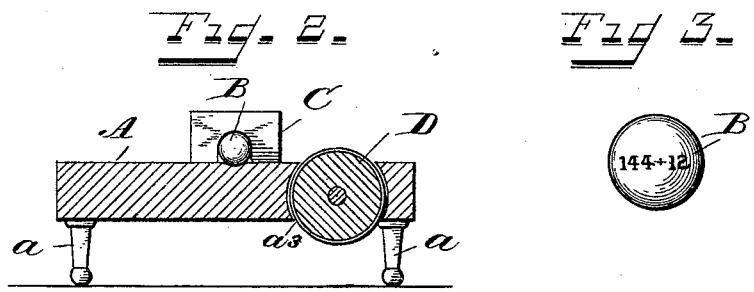

In the drawings: Figure 1 is a perspective view of my complete device. Fig. 2 is a cross section on line 2—2 Fig. 1. Fig. 3 is an enlarged view of one of the marbles. Fig. 4 is an enlarged plan view of a table carried by a roller.

A, designates a stand or board preferably of the form shown, mounted on legs $a$ in such manner that it will be slightly inclined from the front to the rear. In the top of the stand A are formed a longitudinally arranged groove or way $a'$ and a series of receptacles $a^2$ arranged in rows and adapted to hold a number of balls or marbles B, each carrying on its surface a different problem in addition, subtraction, multiplication or division. Spanning the groove $a'$ is a series of graduated arches C preferably twelve in number. The first arch is the largest and is mounted at the front of the stand, the remaining ones decreasing in size toward the rear.

D is an indicator, carrying on its face a series of rows of figures as, for instance, those shown in Fig. 4. These figures designate the answers to the problems carried by the marbles and are so placed on the indicator that the correct answer to any problem will appear opposite the arch designed to arrest the marble.

The indicator D is preferably of roll form and mounted in or under a slot $a^3$ in the stand and parallel to the arches, but any indicator which can be arranged to display the desired series of figures will serve the purpose.

The first row of receptacles $a^2$ contains the marbles carrying problems in addition. The first receptacle is marked 1+ and the marbles contained therein are each marked with a different problem from 1+1 to 1+9. The second receptacle is marked 2+ and the marbles contained therein are each marked with a different problem from 2+1 to 2+8 and so on up to the ninth receptacle which contains only the problem 9+1. Each marble is of a different size, the greater the sum the larger the marble.

To ascertain the answer to the first problem, 1+1, the roller is first turned until the column of figures appears with the + sign at the top. The marble having 1+1 marked thereon (which is the smallest marble in the receptacle) is placed in the groove $a'$ the inclination of the stand causing it to roll until it is stopped by an arch, too small for it to pass under, and situated opposite the answer appearing on the indicator.

The second row of receptacles contains the marbles carrying the problems in subtraction, from 1—0 to 10—9. The first receptacle of this series, being marked 1—, will contain two marbles with the problems 1—0 and 1—1 while the tenth receptacle will contain ten marbles varying in size with the problems 10—9 down to 10—0. The answers are ascertained in the same manner as above described. When the answer is 0 the marble carrying the problem will pass under all the arches and drop into a receptacle $a^4$ at the end of the groove.

The third row of receptacles contains the marbles carrying the problems of the multiplication tables from 1 to 12. In the first receptacle of this series the marbles are marked with the table of one, up to twelve, the second with the table of two, &c. If it is desired to learn the table of five, the indicator is turned until the results in the table of five appear, the column being designated by the sign ×5 at the top of the roll. To multiply nine by five the marble in the fifth receptacle marked 9×5 is placed in the slot and allowed to roll until stopped by an arch too small for it to pass under, the arch being opposite the answer on the indicator, as illustrated in the drawings.

The problems in division are marked on the marbles contained in the bottom row of receptacles and consist of all the problems in division, between 2÷2 and 144÷12, whose quotient will be between the numbers 1 and 12. In the first receptacle the divisors will be equal to the dividends; while the divisors in the twelfth receptacle will be one twelfth of the dividend.

The number of arches and the number of tables may be increased if desired, but I have only deemed it necessary to show a device of the size described to properly illustrate my invention.

In the addition and subtraction of numbers from one to ten the first two arches may be removed to prevent confusion.

What I claim is—

1. The combination of a stand, a series of balls each carrying a mathematical problem, a series of arches each adapted to engage the balls carrying the problems requiring the same answers, and an indicator adapted to register with the arches, substantially as and for the purpose specified.

2. The combination of a stand, a series of balls each carrying a mathematical problem, a series of arches each adapted to engage the balls carrying the problems requiring the same answers, an indicator adapted to register with the arches and carrying a table of figures arranged to bring the results of the mathematical tables in series corresponding with the arches, substantially as and for the purpose specified.

3. The combination of a stand, a series of graduated balls each carrying a mathematical problem, a series of arches each adapted to engage the balls carrying the problems requiring the same answer, and an indicator adapted to register with the arches, substantially as and for the purpose set forth.

4. The combination of a stand, a series of balls each carrying a mathematical problem, a series of graduated arches each adapted to engage with the balls carrying the problems requiring the same answer, and an indicator adapted to register with the arches, substantially as and for the purpose specified.

5. The combination of a stand, a series of graduated balls each carrying a mathematical problem, a series of graduated arches each adapted to engage the balls carrying the problems requiring the same answer, and an indicator adapted to register with the arches, substantially as and for the purpose specified.

ALBERTINA BECHMANN.

Witnesses:
ELLA WALSH,
JAMES N. RAMSEY.